Patented Sept. 4, 1951

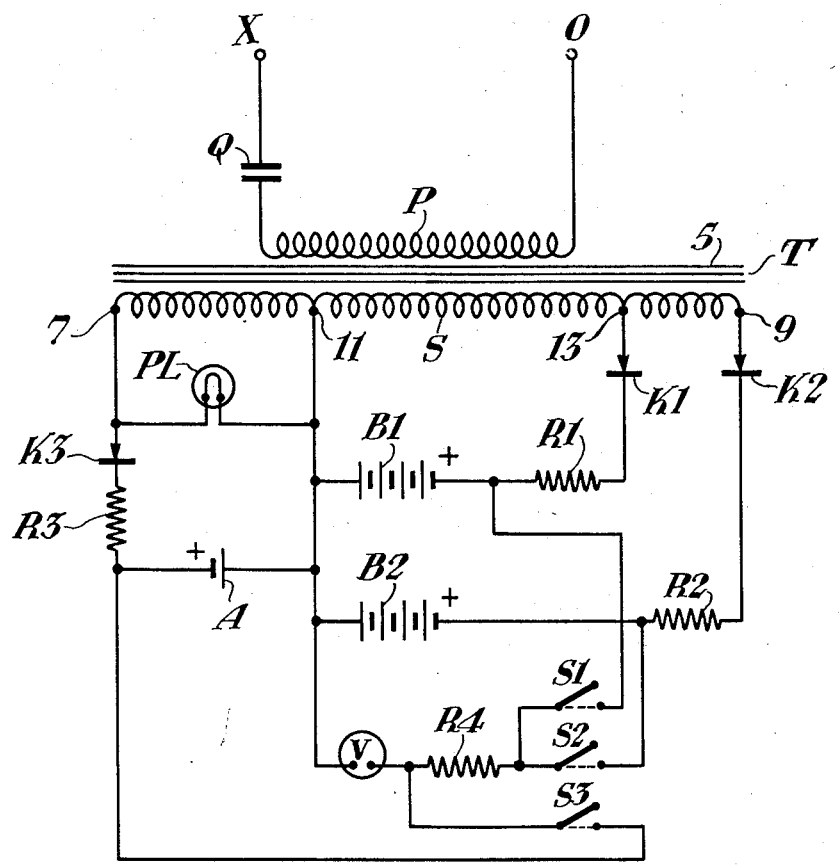

2,566,969

UNITED STATES PATENT OFFICE 2,566,969

POWER SUPPLY MEANS

Andrew J. Sorensen, Edgewood, Pa., assignor to The Union Switch & Signal Company, Swissvale, Pa., a corporation of Pennsylvania Application March 31, 1950, Serial No. 153,098

10 Claims. (Cl. 171—97)

My invention relates to power supply means for supplying regulated energy to one or more loads, and particularly to power supply means for charging primary batteries or storage batteries of the type employed in portable radio sets, or in the small portable type of electronic amplifiers employed in hearing aids.

The chemical action which takes place in a dry cell when energy is supplied thereto is not fully understood, and in this disclosure the term "charging" when applied to a dry cell battery will be understood to mean the process of restoring the battery to or near its initial condition by passing current through the battery in the reverse direction. Also, the term "normal voltage" of a battery is here used to mean the voltage of the battery in its initial condition or slightly above that value as found necessary to bring the battery to its fully charged or reconditioned state.

It has heretofore been proposed to recharge dry cell batteries but this process requires careful regulation of the charging current, since an overcharge or excessive charging current will ruin the battery.

Accordingly, it is an object of my invention to provide power supply means which may be employed for charging primary or storage batteries.

Another object of my invention is to provide a power supply means for charging dry cell batteries, wherewith the charge is automatically regulated to prevent overcharging the battery.

Another object of my invention is to provide power supply means which may be employed for simultaneously charging batteries having different charging requirements.

A further object of my invention is to provide power supply means of the type described which incorporates suitable means for indicating the state of charge of the batteries connected to the charging apparatus.

Still another object of my invention is to provide power supply means for charging batteries, which means incorporate suitable means for indicating that the charging apparatus is functioning properly.

Yet another object of my invention is to provide power supply means for charging batteries in which separate batteries may be charged by pulses of alternate polarity so that the charging of one set of batteries is not affected by the condition of another set of batteries connected with the apparatus.

Other objects of my invention and features of novelty will become apparent from the following description taken in connection with the accompanying drawing.

In practicing my invention, I provide rectifiers of the dry disc type which may be supplied with alternating current energy from a transformer which is arranged with a condenser to operate in the ferro-resonant region and which is proportioned and arranged so that the output voltage of the transformer is held substantially constant. The direct current energy supplied from the rectifiers is supplied to the load, such as the primary or storage batteries to be charged. The apparatus is constructed and arranged so that the half cycles of one polarity of the alternating current supply charging energy for one load or set of batteries, and the half cycles of the other polarity of the alternating current supply charging energy for a different load or set of batteries. Moreover, suitable taps of the transformer winding are provided, in conjunction with regulating resistors, for supplying charging energy of different values, so that different loads or batteries having different charging characteristics may be charged simultaneously. In order to indicate that the charging is progressing, I provide a suitable means, such as a pilot light, for indicating the presence of energy of suitable value in the winding of the transformer. Additionally, the voltage across the load, or the state of charge of the batteries is indicated by the provision of a suitable voltmeter which may be connected at will across the batteries being charged, to indicate their state of charge.

This arrangement is an improvement upon the power supply means shown and described in my application for Letters Patent of the United States, Serial No. 23,460, filed on April 27, 1948, now Patent No. 2,503,774 of April 11, 1950.

I shall describe one form of power supply means embodying my invention and shall then point out the novel features thereof in claims.

The single accompanying drawing is a diagrammatic view showing a preferred form of power supply means embodying my invention.

Referring to the drawing, there is shown a transformer T having a primary winding P and a secondary winding S of suitable type mounted on an iron core structure 5. The secondary winding S of transformer T, in addition to having the end terminals 7 and 9, is provided with taps 11 and 13, in order to provide suitable voltages at different polarities, as will be subsequently described. The primary winding P of transformer T is connected in series with the condenser Q, and the series combination of the primary winding P and condenser Q is connected to a pair of terminals X and O adaped to be connected to a suitable source of alternating current, not shown. The condenser Q and the winding P of transformer T are proportioned and arranged so that the transformer is operated beyond its ferroresonant point. Such an arrangement is characterized by the fact that as the voltage of the alternating current energy supplied to the terminals X and O is increased from zero value, the voltage across the transformer winding remains low until the supply voltage reaches a definite value, say, for example, 70 volts for a 110 volt transformed. At this point, if the supply voltage is increased by a small amount, the voltage across the winding of the transformer will suddenly increase by a factor between 5 and 10. After this sudden increase, if the supply voltage is reduced, the voltage across the winding will remain at its high value, until the supply voltage is reduced beyond a second critical point, at which the voltage across the winding of the transformer will suddenly decrease to a low value. This characteristic is sometimes designated the "jumping phenomenon in ferro-resonance." Such arrangements are well known in the art, and one article on such arrangements is that of P. H. Odessey and Ernst Weber, titled "Critical Conditions of Ferro-resonance," appearing in the August 1938 issue of Electrical Engineering.

The condenser Q and the primary winding P of transformer T are arranged and proportioned so that when alternating current energy of suitable voltage, say, for example, 110 volts, is supplied to the terminals X and O, the voltage will be such that the combination will operate beyond the ferro-resonant point, and as a result, after the supply voltage is initially supplied, the voltage across the primary winding P will remain substantially constant despite variations thereafter in the supply voltage. Accordingly, alternating current energy will be induced in the secondary winding S of transformer T, and the parts are constructed and arranged so that with the voltage in the primary winding P remaining substantially constant, the voltage of the energy induced in the secondary winding S will also remain substantially constant.

The secondary winding S of transformer T is constructed and arranged so that during one half cycle of the alternating current induced therein, the end terminal 7 at the left-hand end of the secondary winding S has an instantaneous positive polarity with respect to the tap 11, and during the other half cycle of the alternating current, the terminals 9 and 13 at the right-hand end of the secondary winding S have a positive polarity with respect to terminal 11. Accordingly, it will be seen that the terminal 11 may be designated as a common terminal, and during one half cycle of the alternating current the terminal 7 is positive with respect to terminal 11, while during the other half cycle of the alternating current, the terminals 9 and 13 are positive with respect to terminal 11.

It will be apparent to those skilled in the art that the transformer T may be of the autotransformer type employing a single winding rather than the type of transformer shown, having separate primary and secondary windings. Additionally, the secondary winding may be divided into a plurality of individual windings, if so desired.

A pilot light PL is shown connected across the terminals 7 and 11 of secondary winding S, and when the transformer is properly energized, the pilot light PL will be lighted, to indicate that the apparatus is in its operating condition. As previously pointed out, the voltage across the secondary winding S of transformer T remains substantially constant despite variations in the line voltage, and accordingly, the voltage across terminals 7 and 11 of the secondary winding will also remain substantially constant. Therefore, the pilot light PL will not be subject to variations in the voltage of the energy supplied thereto, resulting in longer life of the filament of the lamp. It will be obvious that the pilot light PL may be connected to any suitable taps of the secondary winding S, to provide the proper voltage for the illumination of the lamp.

The apparatus additionally comprises dry disc rectifiers K1, K2, and K3, with their associated resistors R1, R2, and R3, which are included in the circuits for supplying charging energy to the batteries B1, B2, and A. A voltmeter V is provided for determining the state of charge of the three batteries, and the voltmeter may be selectively connected to any one of the batteries by means of the switches S1, S2, or S3, the switches S1 and S2 having associated therewith a multiplier resistor R4, in order that the voltmeter may read on a high voltage scale when either the switch S1 or S2 is closed to connect the voltmeter across the high voltage batteries, so that the one voltmeter may read the voltage of either the high voltage batteries B1 and B2 or the low voltage battery A.

A circuit for supplying charging energy to the low voltage battery A may be traced from terminal 7 of secondary winding S, through the rectifier K3, through the resistor R3 to the positive terminal of battery A, and from the negative terminal of battery A to terminal 11 of the secondary winding S. Accordingly, it will be seen that during the portion of the alternating current cycle in which the terminal 7 is positive with respect to terminal 11, energy will flow from the secondary winding S through the rectifier K3 and the resistor R3, to the positive terminal of the battery A, and with the negative terminal connected to terminal 11, energy will be supplied through the battery A to charge the battery. During that portion of the alternating current cycle in which the terminal 11 is positive with respect to terminal 7, energy cannot flow in the circuit traced above because the rectifier K3 is poled in the opposite direction.

During the half cycle in which the terminal 11 is positive with respect to terminal 7, it will be seen that the terminals 9 and 13 are then positive with respect to terminal 11. At this time therefore energy will flow through a circuit which may be traced from terminal 13 of secondary winding S, through the rectifier K1, and through resistor R1 to the positive terminal of battery B1, the negative terminal of which is connected to terminal 11 of the secondary winding S. Additionally, energy will flow through a circuit which may be traced from terminal 9 of secondary winding S to the rectifier K2, and the resistor R2 to the positive terminal of battery B2, the negative terminal of which is also connected to terminal 11 of secondary winding S. It will be seen therefore that at this time energy is supplied to the high voltage batteries B1 and B2. During the half cycle in which the terminal 7 is positive with respect to terminal 11 supplying charging energy to battery A, the terminal 11 will be positive with respect to terminals 9 and 11, and since the rectifiers K1 and K2 are poled in the opposite direction, no energy can flow at this time to the batteries B1 and B2.

It follows from the foregoing that battery charging apparatus arranged in accordance with my invention provides for the charging of separate batteries on alternate half cycles of the alternating current energy supplied to the apparatus. By arranging the apparatus in this manner so that the charging current for the high voltage battery is taken on one polarity of the alterntaing current supply energy and the current for the low voltage battery is taken on the other polarity of the alternating current supply energy the charging current for each battery is only slightly dependent upon that taken by the batteries being charged on the opposite polarity. Although the arrangement shown and described herein utilizes a high voltage battery charged on one polarity of the supply energy and a low voltage battery charged on the other polarity of the supply energy, it will be obvious that batteries of equal voltages may be charged in the same manner by providing the proper taps on the secondary winding of the transformer.

It will be noted that the high voltage batteries B1 and B2 are separately supplied with charging energy, and with the circuit arranged as shown, the battery B2 is supplied with charging energy at a higher voltage than the battery B1, since the portion of the secondary winding S between terminals 9 and 11 includes more turns than the portion of the secondary winding S between terminals 13 and 11. By properly selecting and proportioning the resistors R1 and R2, the batteries B1 and B2 may be of types which require different charging voltages and currents, and yet may be charged from the same apparatus and charged simultaneously as shown.

It is to be pointed out that each charging circuit will preferably be provided with a pair of resilient terminals between which the battery unit can be slipped. Dry cell battery units usually are constructed with a terminal at each end of the unit and the charging circuit terminals would be spaced apart so that when the battery unit is slipped into place in the circuit the battery terminals will be in contact with the circuit terminals.

In order to determine the state of charge of the batteries, the voltmeter may be selectively connected across each of the batteries to determine the voltage thereof. When switch S3 is closed, the voltmeter is connected directly across the terminals of battery A to read the voltage of this battery. When switch S1 is closed the voltmeter is connected across the terminals of battery B1 in series with a multiplier resistor R4, and when switch S2 is closed, the voltmeter is connected across the terminals of battery B2 in series with the multiplier resistor R4. By employing a suitable value of multiplier resistor, it is obvious that the single voltmeter may be made to read on two different scales to indicate the voltage of both the high and the low voltage batteries.

In order to prevent the overcharging of the batteries it is necessary to reduce the charging current supplied to the batteries as the voltage of the batteries approaches its normal value. This operation is obtained by proportioning the secondary winding S, the limiting resistors R1, R2, and R3, and the rectifiers K1, K2, and K3 so that the voltage of the energy supplied to the batteries is equal to the normal voltage of the batteries. As previously pointed out, the ferro-resonant operation of the transformer keeps the voltage of the energy induced in secondary winding S at a constant value, despite variations in the line or supply voltage. Accordingly, the voltage of the charging energy supplied to the batteries from the secondary winding S will remain constant. As the batteries become charged, their voltage approaches the normal value, and with decreasing difference in the voltage of the charging energy and the voltage of the battery, the current is diminished accordingly, until its value becomes very small as the battery reaches its normal voltage. Thus, the charging current is automatically decreased as the batteries become charged, and deleterious effects due to overcharging are thereby avoided.

From the foregoing, it will be seen that I have provided battery charging apparatus which is arranged so that the charging operation is automatically suspended when the batteries reach their normal voltage, and in addition, my apparatus is arranged and constructed so that batteries of different voltages may be charged simultaneously without the charging of one battery affecting the other battery. In addition, I provide means for indicating the proper operation of the apparatus and for the state of charge of the batteries connected thereto.

Although I have herein shown and described only one form of battery charging apparatus embodying my invention, it is to be understood that various changes and modifications may be made therein within the scope of the appended claims without departing from the spirit and scope of my invention.

Having thus described my invention, what I claim is:

1. In a power supply means, in combination, a pair of input terminals to which an alternating current source may be connected at times, a ferro-resonant combination comprising a transformer and a condenser connected in series across said input terminals, said ferro-resonant combination being operated beyond the ferro-resonant point when alternating current of suitable value is supplied to said input terminals, a first and a second rectifier, a first and a second load each requiring a given voltage of direct current, means including said first rectifier for supplying energy from said transformer to said first load on one polarity of the alternating current supplied to said transformer, and means including said second rectifier for supplying energy from said transformer to said second load on the other polarity of the alternating current supplied to said transformer, the parts being proportioned and arranged so that the voltage of the energy supplied to said loads when said ferro-resonant combination is operating beyond said ferro-resonant point does not exceed said given voltage.

2. In a power supply means, in combination, a pair of input terminals to which an alternating current source may be connected at times, a ferro-resonant combination comprising a transformer having a first and a second winding and a condenser connected in series with the first winding, said condenser and said first winding being connected in series across said input terminals, said ferro-resonant combination being operated beyond the ferro-resonant point when alternating current of suitable value is supplied to said input terminals, a first and a second rectifier, a first and a second load each requiring a given voltage of direct current, means including said first rectifier for supplying energy from said second winding of said transformer to said first load on one polarity of the alternating current supplied to said transformer, and means including said second rectifier for supplying energy from said second winding of the transformer to said second load on the other polarity of the alternating current supplied to said transformer, the parts being proportioned and arranged so that the voltage of the energy supplied to said loads when said ferro-resonant combination is operating beyond said ferro-resonant point does not exceed said given voltage.

3. In a power supply means, in combination, a pair of input terminals to which an alternating current source may be connected at times, a ferro-resonant combination comprising a transformer having a first and a second winding and a condenser connected in series with the first winding, said condenser and said first winding being connected in series across said input terminals, said ferro-resonant combination being operated beyond the ferro-resonant point when alternating current of suitable valve is supplied to said input terminals, a first and a second rectifier, a first and a second load each requiring a given voltage of direct current, means including said first rectifier for supplying energy from said second winding of said transformer to said first load on one polarity of the alternating current supplied to said transformer, means including said second recitifier for supplying energy from said second winding of said transformer to said second load on the other polarity of the alternating current supplied to said transformer, and means responsive to the presence of energy of a predetermined value in said secondary winding to indicate the presence of energy of suitable value to supply said given voltage.

4. In a power supply means, in combination, a pair of input terminals to which an alternating current source may be connected at times, a ferro-resonant combintion comprising a transformer having a first and a second winding and a condenser connected in series with the first winding, said condenser and said first winding being connnected in series across said input terminals, said ferro-resonant combination being operated beyond the ferro-resonant point when alternating current of suitable value is supplied to said input terminals, a first and a second rectifier, a first and a second load each requiring a given voltage of direct current, means including said first rectifier for supplying energy from said second winding of said transformer to said first load on one polarity of the alternating current supplied to said transformer, means including said second rectifier for supplying energy from said second winding of said transformer to said second load on the other polarity of the alternating current supplied to said transformer, means responsive to the presence of energy of a predetermined value in said secondary winding to indicate the presence of energy of suitable value to supply said given voltage, and means for indicating the voltage drop across said loads.

5. In a power supply means, in combination, a pair of input terminals to which an alternating current source may be connected at times, a ferro-resonant combination comprising a transformer having a first and a second winding and a condenser connected in series with the first winding, said condenser and said first winding being connected in series across said input terminals, said ferro-resonant combination being operated beyond the ferro-resonant point when alternating current of suitable value is supplied to said input terminals, a first and a second rectifier, a first and a second load each requiring a given voltage of direct current, means including said first rectifier for supplying energy from said second winding of said transformer to said first load on one polarity of the alternating current supplied to said transformer, means including said second rectifier for supplying energy from said second winding of said transformer to said second load on the other polarity of the alternating current supplied to said transformer, means responsive to the presence of energy of a predetermined value in said secondary winding to indicate the presence of energy of suitable value to supply said given voltages, and means for indicating the voltage drop across said loads and comprising a multirange voltmeter adapted to be connected at times to each of said loads individually.

6. In a power supply means, in combination, a pair of input terminals to which an alternating current source may be connected at times, a ferro-resonant combination comprising a transformer having a first and a second winding and a condenser connected in series with the first winding, said condenser and said first winding being connected in series across said input terminals, said ferro-resonant combination being operated beyond the ferro-resonant point when alternating current of suitable value is supplied to said input terminals, a first and a second rectifier, a first and a second load each requiring a given voltage of direct current, means including said first rectifier for supplying energy from said second winding of said transformer to said first load on one polarity of the alternating current supplied to said transformer, means including said second rectifier for supplying energy from said second winding of the transformer to said second load on the other polarity of the alternating current supplied to said transformer, the parts being proportioned and arranged so that the voltage of the energy supplied to said loads when said ferro-resonant combination is operating beyond said ferro-resonant point does not exceed said given voltage, means including a pilot lamp connected across at least a portion of said secondary winding to indicate the presence of energy of suitable value to supply said given voltage.

7. In a power supply means, in combination, a pair of input terminals to which an alternating current source may be connected at times, a ferro-resonant combination comprising a transformer having a first and a second winding and a condenser connected in series with the first winding, said condenser and said first winding being connected in series across said input terminals, said ferro-resonant combination being operated beyond the ferro-resonant point when alternating current of suitable value is supplied to said input terminals, a first and a second rectifier, a first and a second load each requiring given voltages of direct current, means including said first rectifier for supplying energy from said second winding of said transformer to said first load on one polarity of the alternating current supplied to said transformer, means including said second rectifier for supplying energy from said second winding of the transformer to said second load on the other polarity of the alternating current supplied to said transformer, the parts being proportioned and arranged so that the voltage of the energy supplied to said loads when said ferro-resonant combination is operating beyond said ferro-resonant point does not exceed said given voltage, means including a pilot lamp connected across at least a portion of said secondary winding to indicate the presence of energy of suitable value to supply said given voltage, and means for indicating the voltage drop across said loads.

8. In a power supply means, in combination, a pair of input terminals to which an alternating current source may be connected at times, a ferro-resonant combination comprising a transformer having a first and a second winding and a condenser connected in series with the first winding, said condenser and said first winding being connected in series across said input terminals, said ferro-resonant combination being operated beyond the ferro-resonant point when alternating current of suitable value is supplied to said input terminals, a first and a second rectifier, a first and a second load each requiring a given voltage of direct current, means including said first rectifier for supplying energy from said second winding of said transformer to said first load on one polarity of the alternating current supplied to said transformer, means including said second rectifier for supplying energy from said second winding of the transformer to said second load on the other polarity of the alternating current supplied to said transformer, the parts being proportioned and arranged so that the voltage of the energy supplied to said loads when said ferro-resonant combination is operating beyond said ferro-resonant point does not exceed said given voltage, means including a pilot lamp connected across at least a portion of said secondary winding to indicate the presence of energy of suitable value to supply said given voltage, and means for indicating the voltage drop across said loads comprising a multirange voltmeter adapted to be connected at times to each of said loads individually.

9. In a power supply means, the combination comprising, a pair of input terminals to which an alternating current may be supplied, a ferro-resonant combination comprising a transformer having a first and a second winding and a condenser, said condenser and said first winding being connected in series across said pair of input terminals, said ferro-resonant combination being constructed to operate beyond the ferro-resonant point when alternating current of a given frequency and a selected voltage is supplied to said pair of input terminals, a first and a second rectifier, a first and a second pair of load terminals to which direct voltages of a value selected individually for each pair of load terminals are to be supplied, a first circuit means including said first rectifier to connect said first pair of load terminals to said second transformer winding for supplying a direct voltage to that pair of terminals during the half cycles of one polarity of the alternating current supplied to said pair of input terminals, a second circuit means including said second rectifier to connect said second pair of load terminals to said second transformer winding for supplying a direct voltage to that pair of terminals during the half cycles of the other polarity of the alternating current supplied to said pair of input terminals, and said first and second circuit means being proportioned and arranged so that the direct voltage supplied to each of said first and second pairs of load terminals does not exceed the values selected individually for the two pairs of load terminals when said ferro-resonant combination is operating beyond said ferro-resonant point.

10. In a power supply means, the combination comprising, a pair of input terminals to which an alternating current may be supplied, a ferro-resonant combination comprising a transformer having a first and a second winding and a condenser, said condenser and said first winding being connected in series across said pair of input terminals, said ferro-resonant combination being constructed to operate beyond the ferro-resonant point when alternating current of a given frequency and a selected voltage is supplied to said pair of input terminals, said second transformer winding having a first and a second outside terminal and an intermediate terminal, a first and a second rectifier, a first and a second pair of load terminals to which there are to be supplied a first and a second given direct voltage respectively, a first circuit means including said first rectifier to connect said first pair of load terminals to said first outside terminal and said intermediate terminal of said second winding for supplying said first direct voltage during the half cycles of one polarity of the alternating current supplied to said input terminals, a second circuit means including said second rectifier to connect said second pair of load terminals to said second outside terminal and said intermediate terminal of said second winding for supplying said second direct voltage during the half cycles of the other polarity of the alternating current supplied to said input terminals, and said first and said second terminals being proportioned and arranged in such a manner that the direct voltages supplied to said first and second pairs of load terminals do not exceed said first and second given voltages respectively when said ferro-resonant combination is operating beyond said ferro-resonant point.

ANDREW J. SORENSEN.

No references cited.